United States Patent [19]
Wojaczynski et al.

[11] Patent Number: 5,442,375
[45] Date of Patent: Aug. 15, 1995

[54] METHOD AND APPARATUS FOR IDENTIFYING COLOR USAGE ON A MONOCHROME DISPLAY

[75] Inventors: David J. Wojaczynski, Mission Viejo; Kurt M. Breuninger, Tustin, both of Calif.

[73] Assignee: Toshiba America Information Systems, Inc., Irvine, Calif.

[21] Appl. No.: 36,699

[22] Filed: Mar. 25, 1993

[51] Int. Cl.⁶ .............................................. G09G 3/00
[52] U.S. Cl. ................... 345/147; 345/150; 345/153; 345/119; 345/89
[58] Field of Search ............... 345/150, 153, 154, 88, 345/89, 112, 118, 119, 3, 147, 148, 146

[56] References Cited

U.S. PATENT DOCUMENTS

| | | | |
|---|---|---|---|
| 4,079,417 | 3/1978 | Scudder, III | 358/111 |
| 4,105,922 | 8/1978 | Lambert et al. | 364/413.22 |
| 4,439,759 | 3/1984 | Fleming et al. | 345/114 |
| 4,550,315 | 10/1985 | Bass et al. | 345/199 |
| 4,651,146 | 3/1987 | Lucash et al. | 345/119 |
| 4,694,286 | 9/1987 | Bergstedt | 345/146 |
| 4,703,317 | 10/1987 | Shiomi et al. | 345/24 |
| 4,710,806 | 12/1987 | Iwai et al. | 348/391 |
| 4,721,951 | 1/1988 | Holler | 345/154 |
| 4,751,502 | 6/1988 | Ishii et al. | 345/1 |
| 4,755,954 | 7/1988 | Netter | 395/132 |
| 4,763,283 | 8/1988 | Coutrot | 364/526 |
| 4,827,255 | 5/1989 | Ishii | 345/148 |
| 4,837,710 | 6/1989 | Zelinsky et al. | 395/131 |
| 4,845,477 | 7/1989 | Shibata et al. | 345/22 |
| 4,845,644 | 7/1989 | Anthias et al. | 395/157 |
| 4,873,652 | 10/1989 | Pilat et al. | 345/157 |
| 4,937,036 | 6/1990 | Beard et al. | 345/156 |
| 4,967,373 | 10/1990 | Ginsburg | 345/83 |
| 4,977,398 | 12/1990 | Pleva | 345/147 |
| 4,980,678 | 12/1990 | Zenda | 345/3 |
| 4,980,678 | 12/1990 | Zenda | 345/3 |
| 5,148,518 | 9/1992 | Inoue | 395/131 |
| 5,153,577 | 10/1992 | Mackey et al. | 345/149 |
| 5,196,839 | 3/1993 | Johary | 345/118 |
| 5,218,350 | 6/1993 | Bollman | 345/112 |

FOREIGN PATENT DOCUMENTS 2-278289 11/1990 Japan.
2217080 10/1989 United Kingdom.

OTHER PUBLICATIONS

"T3100SX Portable Personal Computer Reference Manual", published by Toshiba Corporation, Chapter 7, pp. 7-3 through 7-11.

"T1600 Portable Personal Computer Reference Manual", published by Toshiba Corporation, Chapter 6, pp. 6-3 through 6-10.

"T3200 Portable Personal Computer Reference Manual", published by Toshiba Corporation, Chapter 6, pp. 6-4 through 6-9.

Excerpts from Laptop UltraVision manual, copyright 1991 by Personics Corp. (pp. 35–41).

Excerpts from Desktop UltraVision manual, copyright 1992 by Personics Corp. (pp. 31–37).

*Primary Examiner*—Curtis Kuntz
*Assistant Examiner*—Minsun Oh
*Attorney, Agent, or Firm*—Banner, Birch, McKie & Beckett

[57] ABSTRACT

A window for use in a monochrome LCD or gas plasma display is provided with a "Color Finder" button for identifying each of 16 (or 64) colors to be displayed. By activating a button in the window, the indicated gray scale for that color is temporarily inverted so that it oscillates between its current value and its most opposite value. This technique "flashes" the associated shade of gray on the screen, thereby informing the user that the color is in use on the screen and pinpointing just where the color is being displayed. Consequently, this invention allows the computer user to limit gray scale adjustments only to those that are needed.

28 Claims, 9 Drawing Sheets

METHOD AND APPARATUS FOR IDENTIFYING COLOR USAGE ON A MONOCHROME DISPLAY

CROSS REFERENCE TO RELATED APPLICATION

This application is related by subject matter to commonly-assigned, application Ser. No. 07/685,135 now abandoned, which was filed on Apr. 15, 1991.

BACKGROUND OF THE INVENTION

1. Technical Field

This invention generally relates to a display control application for use in a computer having a video display system operating in a Windows OS environment, and more particularly, to a method and apparatus that allows the user of a computer having a monochrome video display screen to determine quickly whether or not the gray scale level representing a selected color is being displayed on the screen, and pinpoint just where on the screen it is being displayed. The user may then immediately adjust the gray scale level as desired.

2. Description Of The Relevant Art

In a conventional computer system designed to utilize a visual color display capable of displaying various hues and luminances, application programs executing on the computer send signals to a graphics display adapter indicating what should be displayed and in what color, and the display adapter then sends signals to the display so that the appropriate items are displayed to the user with the appropriate colors. Various types of display adapters currently exist which are capable of displaying graphical images on displays with varying resolution and color possibilities. Examples of such display adapters include those which are compatible with industry standard protocols, such as EGA, VGA, 8514A, etc.

With any such display adapter, an application program executing on the computer system either directly or indirectly sends signals to the display adapter representing color values to be displayed on the display. In most cases, these signals correspond to color palette registers stored within the display adapter. The colors that the program may use at any one time are represented by values stored within the color palette registers. Specifically, each color palette register stores a value corresponding to one of a large number of available colors for the display adapter. Subsequently, when the program wishes to use that color, the program references the particular color palette register where that color is stored. In this way, while the maximum number of colors that can be displayed at one time is limited by the number of color palette registers, the subset of colors that can be used at any one time may be chosen from a palette of a large number of colors.

For example, assuming that there exist 16 color palette registers and 256,000 different color combinations, any one of the 256,000 colors may be utilized by placing its value in one of the color palette registers. This is true for all 16 registers, so that when the application is run, it can utilize any of the up to 16 different colors chosen from the palette of 256,000 colors at the same time. Therefore, while all 256,000 colors cannot be displayed at the same time, a manageable subset of 16 can. Currently, some computers utilize 64 color palette registers to manage a subset of 64 different colors.

A problem arises when such a display adapter is used with a non-color or monochrome display, such as a monochrome liquid crystal display (LCD) or gas plasma display, because the intended colors stored within the color palette registers obviously cannot be displayed properly on the non-color display. For example, the gas plasma displays are only capable of displaying their characteristic orange shades, while the LCD's can display blue shades on green or white shades on black, Because the hardware these displays are emulating intend to show true colors, the plasma displays and the LCD's must logically map the intended colors to differing levels of the "color" that the monochrome display is capable of showing. In the plasma displays, colors are mapped to differing levels of orange, and on the LCD's, the intended colors are mapped to shades of white or blue depending upon the characteristics of the LCD.

The mapping of actual colors to particular shades of a color is known as "gray scaling." Each color is assigned a particular level of "gray" so that it remains distinguishable from the other colors, as it would if it were being shown in its true form. For example, the "color" black may be regularly assigned the highest gray scale level (15) so that it appears as black, while bright white may be usually assigned to the lowest gray scale level (0), so that it appears much the same way that it does on a color display.

In order for this mapping to take place, some display adapters, such as those found in Toshiba or other companies' personal computers, utilize "gray scale palette registers" (also referred to as translation palette registers) that contain the new output values to be used in place of the values stored within the color palette registers. For each color palette register, there exists one gray scale palette register that contains a value to be used when determining what color or luminance level actually to display. Special hardware within the display adapter makes changes to the color signals, just before they are displayed, based upon the contents of the gray scale palette registers.

To illustrate, assume that an application program wishes to display a blue box on the attached display screen. First, the value representing the color blue may be stored in color palette register 1. When the application wishes to draw the box, it sends a signal to the display adapter that references the value stored within color palette register 1. If a color display is connected to the display adapter, the display adapter will then send corresponding signals to the color display to draw the desired box on the screen.

However, if a non-color display is connected to the display adapter that is capable of displaying gray scales, such as a monochrome LCD screen, the display of these "colors" as different levels of gray takes additional steps. In addition to the value for the color blue being stored in color palette register 1, a value corresponding to a specific gray scale level (for example 3) may be stored in gray scale palette register 1, which may be selected to correspond to color palette register 1. Thereafter, when the application program sends signals to the display adapter to display the blue box, a box having a gray scale corresponding to the gray scale value stored in gray scale palette register 1 (namely 3) is drawn on the monochrome LCD (or plasma) screen.

If the user of an application program were to change the contents of gray scale palette register No. 1 from 3 to 7, that program would display the blue box with gray scale level 7. Similarly, the other gray scale palette registers, corresponding to the associated color palette registers, could be changed to various values representing the desired gray scale level for the particular color.

As can be seen, the color palette registers and gray scale palette registers will always operate independently from one another. In other words, if the value in a gray scale palette register is changed, only the translation of the associated color in the color palette register will be affected, but the actual color as displayed on a color monitor would not be changed. Specifically, although the true color of the box may be blue, the user may designate the color blue to be displayed as gray scale level 3 on the monochrome LCD screen.

Different application programs display different color schemes while operating. Consequently, when gray scales are being utilized for a monochrome LCD screen, the values stored within the gray scale registers in use while executing one program might not be visually appealing during the execution of another program. For example, assume that a first application program utilizes the colors red and blue in color palette registers 1 and 2, respectively. Also assume that the corresponding gray scale palette registers 1 and 2 store the values 7 and 8, respectively, corresponding to gray scale levels 7 and 8, as set by the user of the computer system. If the first application program never displays the colors red and blue in close proximity to each other on the screen, then the corresponding gray scale values 7 and 8 (which may be visually indistinguishable if shown next to each other) stored within gray scale palette registers 1 and 2 will not be displayed near each other, However, if a second application program is then invoked which attempts to display the same two colors next to each other, then the visual output on the monochrome LCD screen would have gray scale levels 7 and 8 appearing next m each other on the screen. For a particular user, the effect of seeing gray scale levels 7 and 8 displayed next to each other may not be appealing if there is insufficient contrast between the two levels which causes difficulty in distinguishing between them. Such a user may prefer more contrast between gray scales displayed next to each other.

A deficiency which exists when a color applications program is utilized with a non-color display, such as a monochrome LCD screen, is that several gray scale levels may be generated simultaneously, throughout the range of possible values, to drive the display. Unfortunately, given such a circumstance, the user may be unable to look at the display and determine just what shade of gray relates to a particular color. Also, some shades of gray may not be discernible because there is a decided lack of contrast between those shades shown on the screen. Currently, the user must go through a time-consuming process of adjusting the intensity of each gray scale level, in order to see just what shade of gray varies on the screen.

One method used to adjust the intensity of a gray scale mapping on a monochrome LCD screen is to display a "window" containing the 16 (or 64) shaded areas and related scroll bars. The user may adjust the intensity of each shaded area in the "window," using the appropriate scroll bar. However, using this method, it is still difficult for the user to correlate a particular gray scale level in the "window" with the same gray scale level displayed elsewhere on the screen.

Techniques for mapping color images into gray scales using "windows" on monochrome LCD screens are well-known. For example, U.S. Pat. No. 5,153,577 to Mackey et al discloses an emulator that maps foreground colors and background colors into gray pixel patterns for display. Each background color is mapped into a respective gray pattern, while the foreground colors are mapped to three pixel patterns—white, 50% gray, and black. The color images are emulated for use in a monochrome display. Control over the display is provided by accessing an icon for text inside a window.

U.S. Pat. No. 5,148,518 to Inoue discloses a flat panel LCD monochrome display and a digital circuit that converts color coded data to gradation coded data having constant intervals. The gradation coded data then contains differences in gray levels similar to the differences in the color coded data. Thus, the color coded data is adaptable for use with a monochrome display.

Nevertheless, neither the above-described patents nor any conventional LCD (or plasma) monochrome displays currently allow a user to "find" a particular color on the monochrome screen, interactively change the gray scale level associated with that particular color from within a "window," and immediately see the effects of such a change on the rest of the screen. The present invention is designed to accomplish such a function by providing a "Color Finder" feature for use in a Windows environment for a monochrome LCD (or plasma display) screen, which will be discussed below.

SUMMARY OF THE INVENTION

Accordingly, it is an object of this invention to provide an improved computer display system having an arrangement that allows the user of a non-color or monochrome display to find a particular color on the display screen, interactively change the gray scale level associated with that particular color from within a window on the screen, and immediately see the effects of such a change throughout the display.

It is a further object of this invention to provide an improved computer display system that allows a user to make on-the-spot adjustments to the gray scale controls displayed in a window's menu.

It is a further object of this invention to provide an improved computer display system which reduces the time and effort required for an operator to setup or adjust the display screen.

It is yet another object of the present invention to provide an improved computer display system that is more operationally responsive to the user.

In accordance with the present invention, a window for use in a monochrome LCD (or plasma display) is provided with a "Color Finder" button for identifying each of the 16 (or 64) colors to be displayed. By activating a button in the window, the indicated gray scale for that color is temporarily inverted so that it oscillates between its current value and its most opposite value. This technique "flashes" the associated shade of gray on the screen, thereby informing the user that the color is in use on the screen and just where the color is being displayed. Consequently, this invention allows the computer user to limit gray scale adjustments only to those that are needed.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

DETAILED DESCRIPTION OF THE PREFERRED EMBODIMENTS

In a preferred embodiment, this invention is initially intended to be used with Toshiba's Dynapad T100X pen-based PC, to allow a user to make on-the-spot adjustments to the Dynapad T100X PC VGA monochrome LCD screen from within a Microsoft Windows-for-Pen Computing environment. The display control application program that controls the operation of the present invention for the Dynapad T100X PC may be activated by double-tapping with a pen on a display control application icon displayed on the LCD screen. However, an important point to be stressed is that although the preferred embodiment utilizes a pen to activate the control application, the present invention is not intended to be so limited and is so disclosed for illustrative purposes only. For example, instead of using a pen, the control applications program for the present invention may be activated from within a window by the well-known technique of positioning a cursor at an icon or other appropriate object displayed on the screen, using a mouse or the arrow keys on a keyboard. Then the user may "double-tap" the mouse or press the "enter" key to activate the desired application program. Furthermore, the present invention is not intended to be limited just to Dynapad T100X PC 's operating in a Windows environment, and may be used in conjunction with any computer system capable of displaying multiple gray scales on a monochrome screen.

Figure 1A:
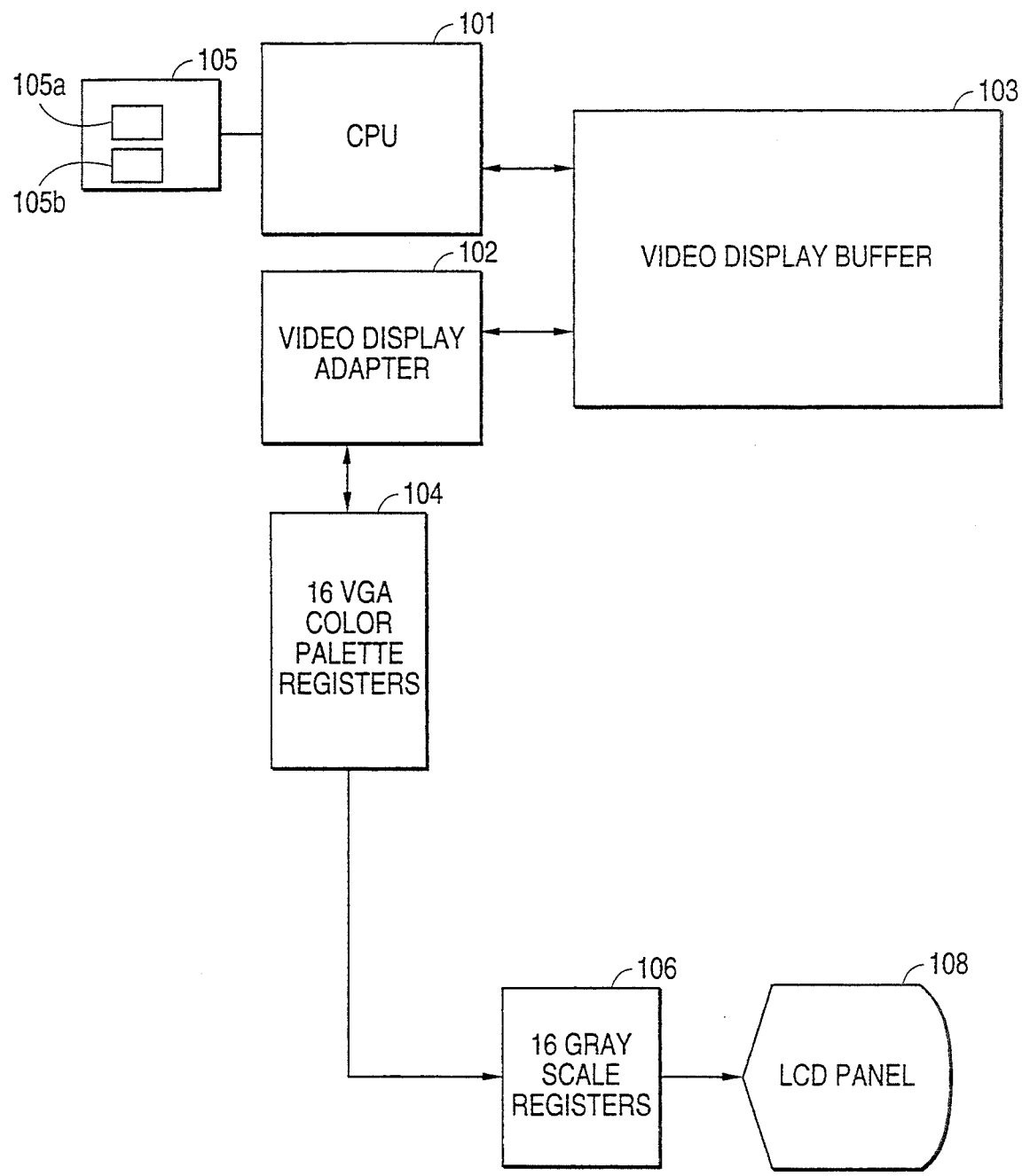
FIGS. 1(a)-(d) are overall functional block diagrams of the microcomputer systems used in accordance with preferred embodiments of the present invention.

Referring to the accompanying figures, FIGS. 1(a)-(d) are functional block diagrams of various computer systems, including the associated video display hardware that may be utilized in a preferred embodiment of the present invention. Although the present invention will be described in detail with respect to the Dynapad T100X PC depicted in FIG. 1(a), the: functioning of the components in FIG. 1(a) is analogous to that of the respective components disclosed in FIGS. 1(b)-(d), except for some minor details that will be explained below. In any event, the computer architectures for the systems depicted in FIGS. 1(a)-(d) are substantially similar with respect to their utilization of the present invention, and their minor differences in structure and operation are readily recognized by those having ordinary skill in the art of computer design.

Referring to FIG. 1(a), a block diagram is shown corresponding to the Toshiba Dynapad T100X PC used in a preferred embodiment of the present invention. Central Processing Unit (CPU) 101, in conjunction with the programs stored in main memory 105, controls the overall functioning of the computer system. Specifically, the operating system routines and application computer programs (such as the display control application) are designed to operate under control of the CPU, in accordance with conventional computer architectures.

Video display adapter 102 receives signals from CPU 101 corresponding to visual information to be displayed on built-in Liquid Crystal Display (LCD) panel 108. Display adapter 102 addresses video display buffer 103, which is located within conventional random access memory, and retrieves data corresponding to the information which is to be displayed to the user. Display adapter 102 operates as a VGA-compatible adapter, thereby processing signals from CPU 102 according to the VGA protocol.

Color palette registers 104, associated with display adapter 102, consist of 16 registers that may hold values representing which of the plurality of available colors (for example, a maximum of 64 available different colors in both VGA and EGA) are to be displayed for each of the 16 colors. The signals sent to display adapter 102 from CPU 101, while running the application program, correspond to one of these sixteen color palette registers. The content of the color palette registers may be modified under control of any program running under the control of CPU 101.

When built-in LCD panel 108 is used as the active display, 16 (or 64) gray scale registers 106, each being capable of being set to correspond to one of 16 color palette registers 104, are also utilized. These gray scale registers contain gray scale levels to be used when each respective color signal is sent from CPU 101 to display adapter 102. In effect, display adapter 104 uses gray scale registers 106 to map each of the sixteen available color signals onto gray scale levels stored within the 16 (or 64) gray scale registers independent of the color values stored within the color palette registers. The gray scale levels stored within gray scale registers 106 are modifiable in accordance with the present invention.

For some computer systems, there may not be a one-to-one correspondence between a particular color palette register and particular gray scale register. In other words, there may be more gray scale registers (e.g., 64) than color palette registers (16). A mapping between the gray scale registers and color palette registers in most computer systems is defined based on the RGB color value stored in a particular color palette register. The RGB value is passed through an algorithm that produces a gray scale register number. That gray scale register contains a gray level that is ultimately displayed on the LCD (or plasma) flat panel screen. A different gray scale register may be selected by changing the RGB value stored in a given color palette register. Such mapping between gray scale registers and color palette registers is accomplished by conventional computer design techniques, and the use of such a particular technique is not necessarily required for one of ordinary skill in the art of computer system architecture design and programming to understand the present invention.

Figure 1B:
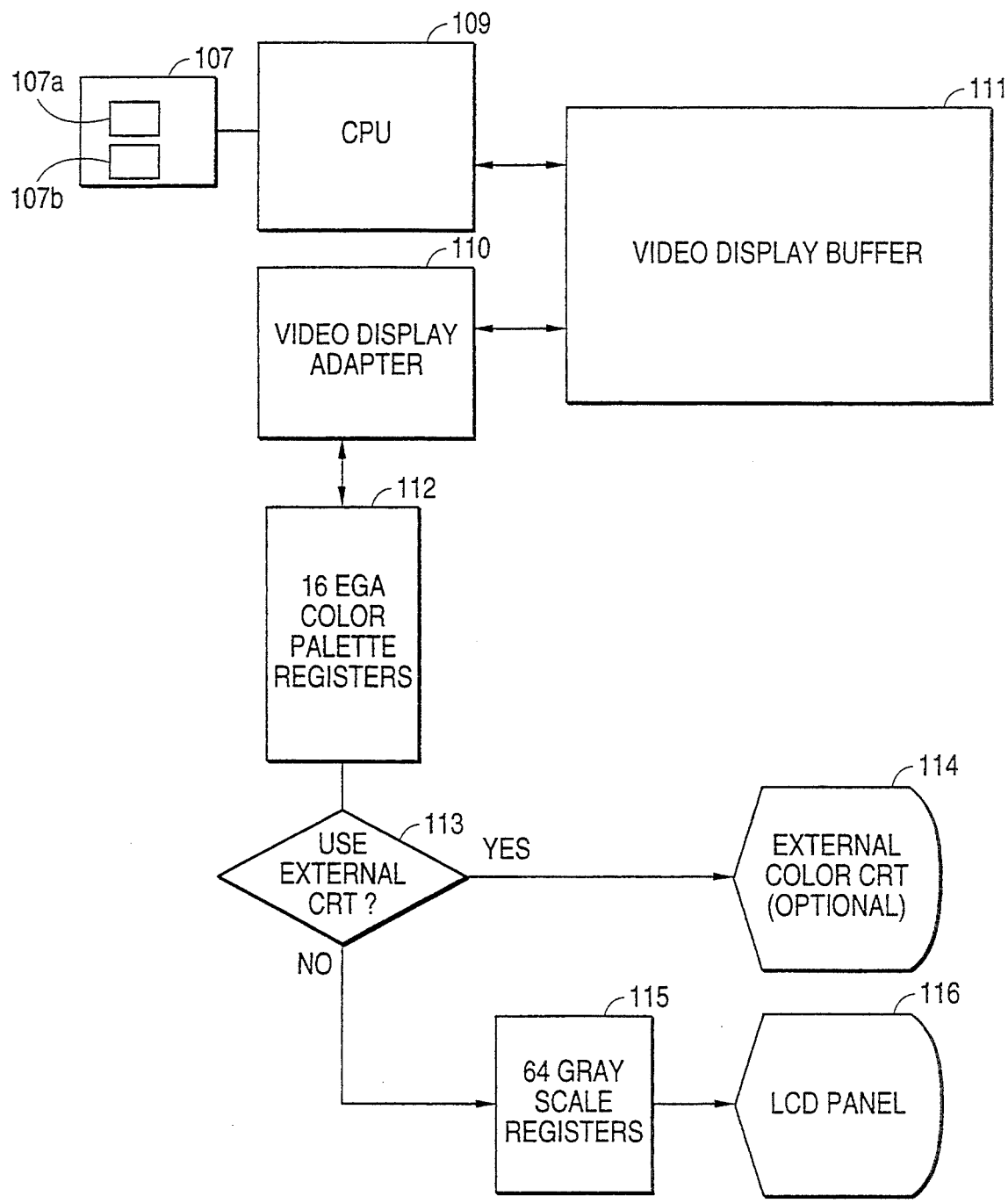

FIG. 1(b) shows a block diagram corresponding to a Toshiba T1600 personal computer that may be used in an embodiment of the present invention. Blocks 107-112, 115 and 116 of FIG. 1(b) represent functionally identical components to blocks 101-106 and 108 disclosed in FIG. 1(a). Unlike FIG. 1(a), however, the T1600 computer is capable of utilizing 64 gray scale registers 115, rather than 16 gray scale registers. Also, the T1600 computer uses the EGA protocol for display adapter 110, rather than the VGA protocol used in FIG. 1(a). Finally, unlike FIG. 1(a), the T1600 computer may be configured optionally to display color information on external color CRT 114. In this case, video display adapter 110 receives signals from CPU 109 corresponding to visual information to be displayed on either external color CRT 114 or built-in LCD panel 116. Block 113 corresponds to the logical decision that may be made by the user of the computer system about whether or not external color CRT 114 may be utilized in addition to built-in LCD panel 116. If the external CRT is to be used, then the colors stored in the 16 EGA color palette registers 112 will be used when respective signals are sent to display adapter 110 from CPU 109. In this case, the present invention is not utilized, since no gray scale mapping is necessary because of the external CRT's inherent ability to display the selected colors.

Figure 1C:
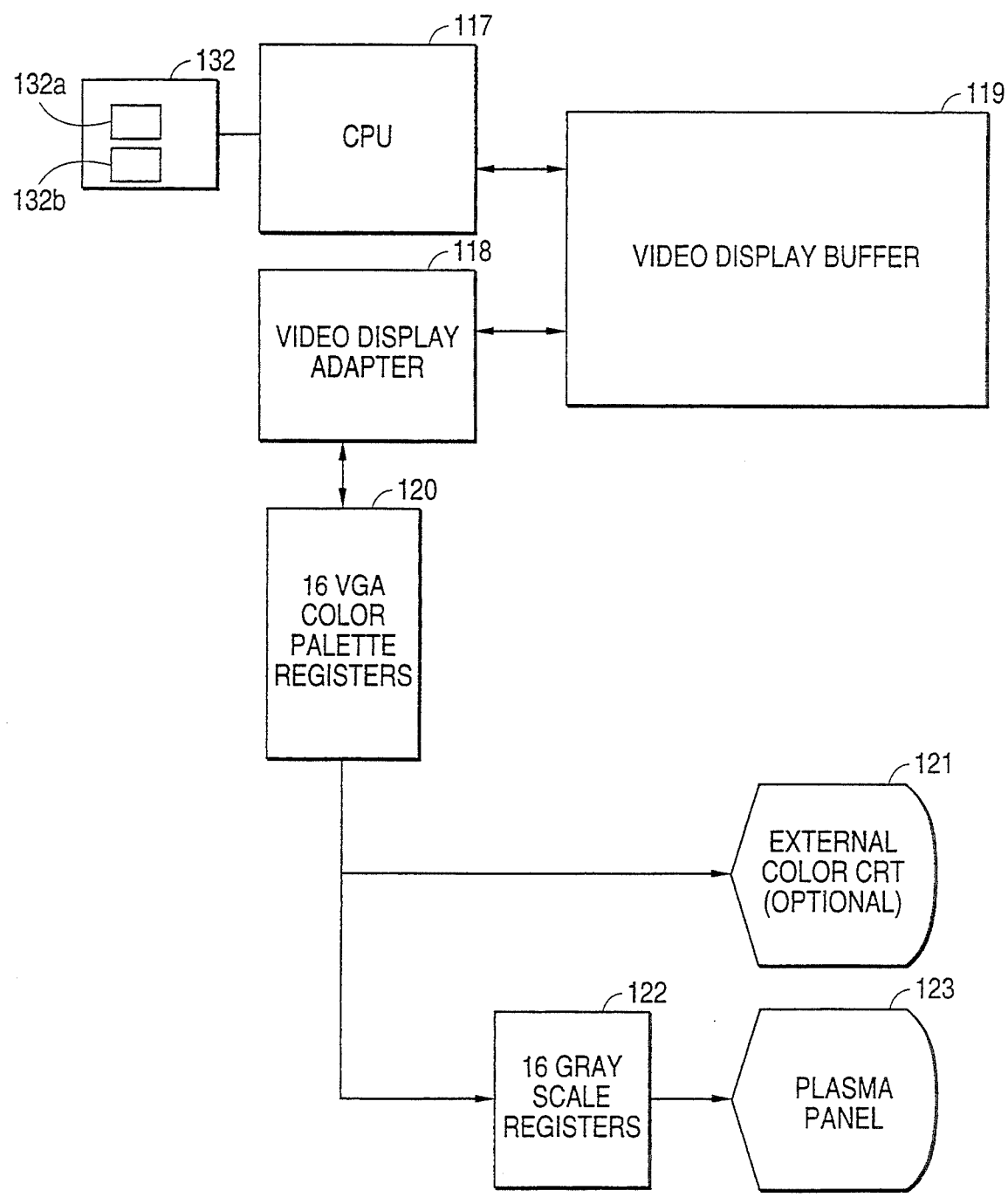

FIG. 1(c) depicts a block diagram corresponding to the Toshiba T31005X, T32005X and T5200 personal computers, in accordance with another embodiment of the present invention. Blocks 117–120 and 132 of FIG. 1(c) represent functionally equivalent components to blocks 101–105 of FIG. 1(a). However, unlike the Dynapad T100X PC of FIG. 1(a) or the T1600 system of FIG. 1(b), the computers disclosed in FIG. 1(c) may utilize both external color CRT 121 and built-in gas plasma display 123 at the same time.

Figure 1D:
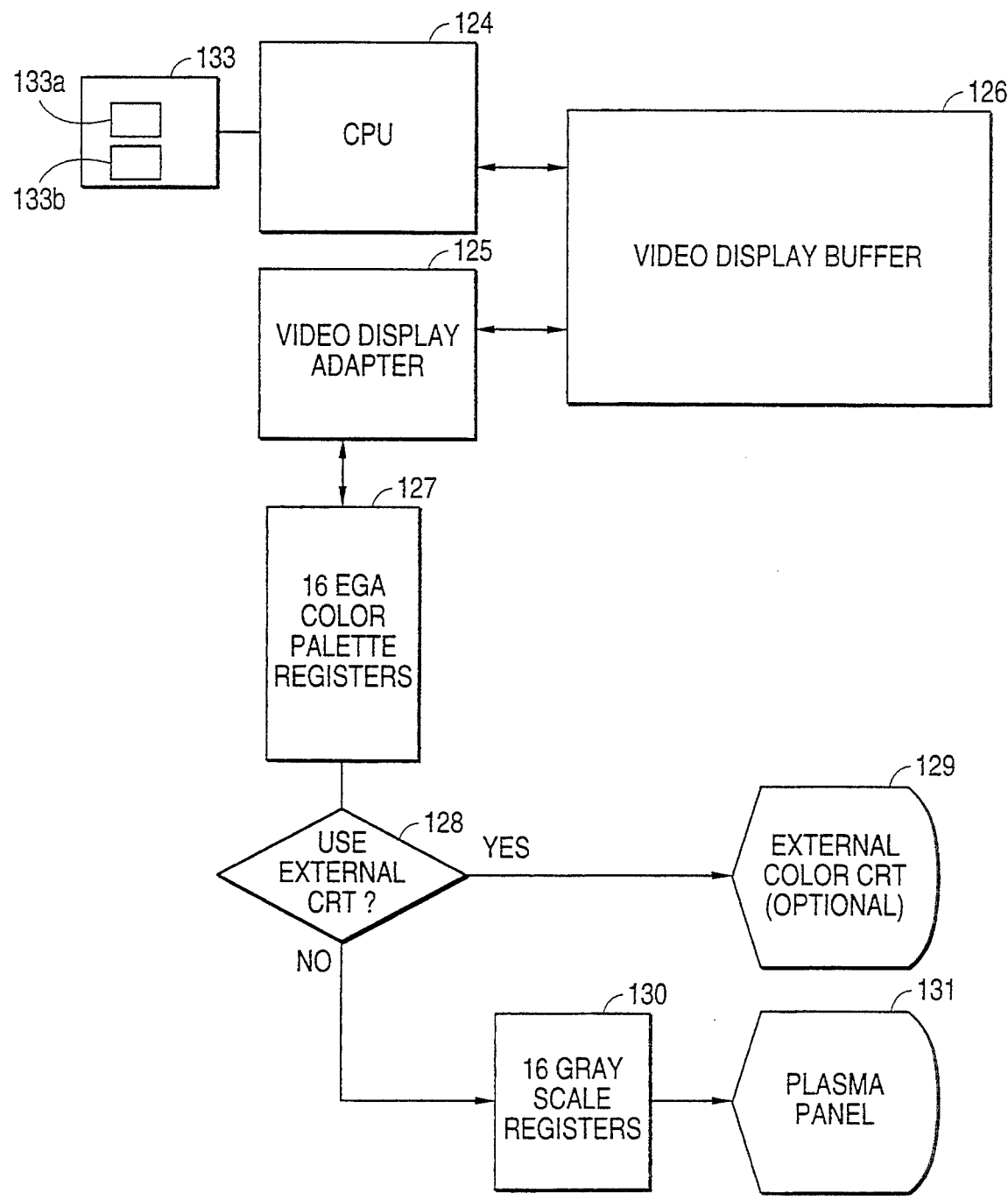

FIG. 1(d) shows a block diagram corresponding to the Toshiba T5100 and T3200 personal computers, in accordance with yet another embodiment of the present invention. Blocks 124, 126–128, 133 and 129–130 of FIG. 1(d) represent functionally equivalent components to blocks 101 and 103–106 of FIG. 1(a). However, the computer systems depicted in FIG. 1(d) utilize the EGA protocol for display adapter 125, instead of the VGA protocol used in the Dynapad T100X PC. Also, the T5100 and T3200 computers of FIG. 1(d) utilize built-in gas plasma display 131, instead of built-in LCD panel 108 as the active display. Decision block 128 and external color CRT 129 of FIG. 1(d) represent functionally equivalent components to respective blocks 113 and 114 of FIG. 1(b). Otherwise, the functioning of the components of FIG. 1(d) are analogous to the respective components of FIG. 1(a).

Figure 2B:
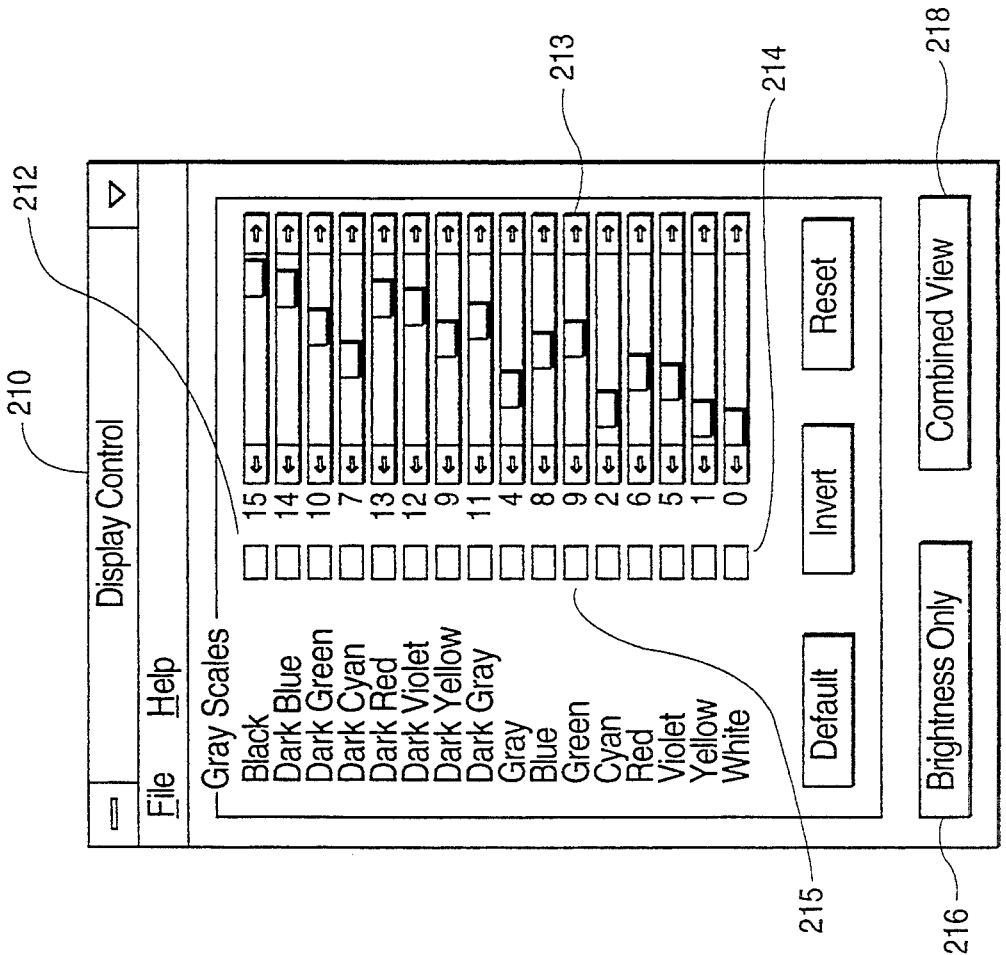
FIGS. 2(a)-(c) depict visual window displays of a display control application in accordance with a preferred embodiment of the present invention.
Figure 2A:
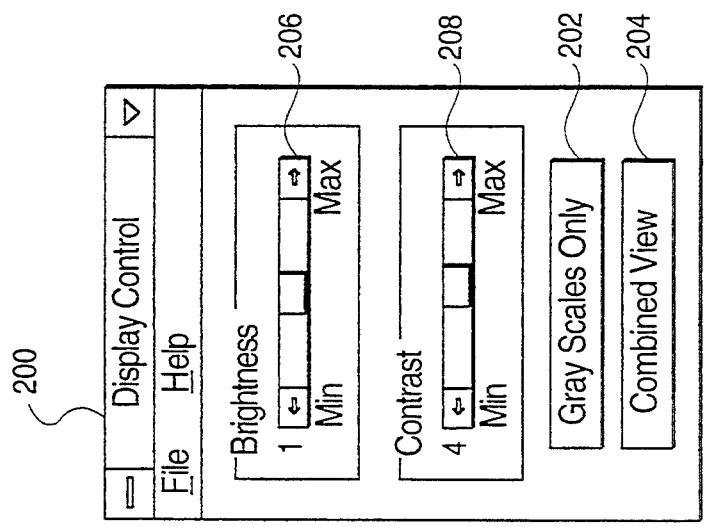
Figure 2C:
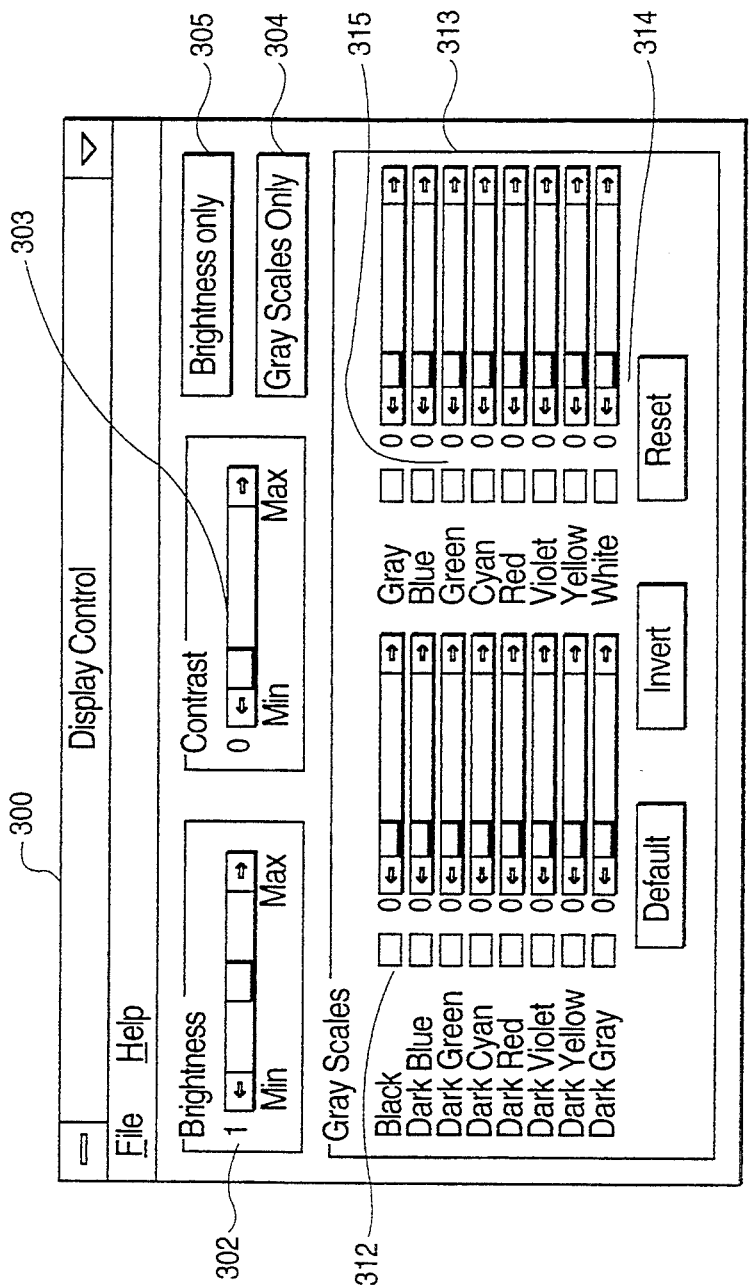

FIGS. 2(a)–(c) depict visual window displays of the display control application in accordance with a preferred embodiment of the present invention. Referring to FIG. 2(a), brightness/contrast only menu 200 is displayed on built-in LCD panel 108, in response to the user's activating a display control application program by double-tapping with a pen on an appropriate icon displayed on the LCD screen and located within a designated Toshiba machine configuration group. Knowledge of the detailed structure and method used to activate such a display control application program is not required by one of ordinary skill in the art of computer architecture design and programming, in order to understand the present invention. Consequently, such details will not be described here. Essentially, the color finder application, which embodies the present invention and will be described in detail below, may be activated from within gray scales only menu 210 depicted in FIG. 2(b), by using an appropriate pen pointing device (not explicitly shown).

Generally, referring to FIGS. 2(a)–(c), from brightness only menu 200, a user may increase or decrease the LCD screen brightness or contrast by "thumbing" and "tapping" the pen device over brightness control 206 or contrast control 208, respectively. Any adjustments made either to the screen brightness or contrast will be immediately visible on the display to the user. Also using a pen, a user may activate gray scales only application menu 210 or combined view application menu 300, by "tapping" gray scales only control 202 or combined view control 204, respectively. The technique of "tapping" a pen device on a control bar or "thumbing" a scroll bar in a standard Windows OS menu, in order to select another menu or adjust screen brightness, is well-known to those of ordinary skill in the art of computer architecture design and programming.

Referring to FIG. 2(b), the user may select combined view menu 300 (FIG. 2(c)) to view by "tapping" combined view control 218, or return to brightness only menu 200 (FIG. 2(a)) by "tapping" brightness only control 216. The level (shade of gray) of a particular gray scale may by adjusted by sliding the pen horizontally ("thumbing") along respective scroll bar 0–15 on gray scale only menu 210. Specifically, the gray scale only menu initially shows the default machine settings for gray scale levels of all 16 VGA-compatible Windows stock palette colors. These settings are displayed as standard Windows 3.1 Operating System scroll bars with a range of 0–15, representing a total of 16 available gray scale levels. The gray scale level (shade of gray) that is mapped to any particular stock color can be adjusted by moving the scroll bar thumb along the scroll bar to the right to increase the gray scale level (darker shade), or to the left to decrease the gray scale level (lighter shade). In some systems, and strictly as a matter of design choice, moving the scroll bar to the right may decrease the gray scale level (lighter shade), while moving the scroll bar to the left would then increase the level (darker shade). All 16 pure colors available in the VGA video mode whose default Red, Green, Blue (RGB) values are defined by the overall Windows application, will be indicated by the respective color of each "color finder button" shown vertically as the plurality of rectangular blocks on menu 210 located between (and including) black color finder button 212 and white color finder button 214.

Essentially, the color finder feature of the present invention is activated by "pressing" any one of the plurality of buttons between "black" button 212 and "white" button 214. For example, by pressing color finder button 215, the gray scale representation of the color green is "flashed" throughout the screen display. The user may control the number of times that the shade flashes. Consequently, the user may then adjust scroll bar 213 immediately to vary the level of that particular gray scale as desired. Of course, the window that displays menu 210 on LCD panel 108 is relatively small in comparison with the rest of the visible screen, and except for the displayed menu, the user's view of the selected gray scale displayed across the screen is unobscured.

More specifically, activating a particular color finder button will cause the indicated gray scale to oscillate quickly between the current gray scale value and its most opposite gray scale value. Any gray scale value that is between 0 (lightest) and 7 inclusive will oscillate between that value and gray scale 15 (darkest). Any gray scale that is between 8 and 15 (darkest) will oscillate between that value and gray scale 0 (lightest). This will have the visual effect of "flashing" the associated "color" in the displayed user application on the screen. Consequently, the user will be informed immediately if the selected color is in use on the screen, and the color's whereabouts on the screen will be pinpointed. Thus, in accordance with this invention, the user will only have to adjust relevant gray scales as needed, as opposed to the conventional trial-and-error technique of varying the value in a particular gray scale register and observing the screen to see if any "color" is changed on the screen, to indicate a valid mapping to that gray scale register.

Referring to FIG. 2(c), combined view menu 300 may be selected from either menu 200 or menu 210 by tapping control 204 or 218, respectively. If desired, the user may return to menu 200 or 210 by tapping controls 305 or 304, respectively. Similar to the controls and scroll bars displayed in menus 200 and 210, the user also may control the brightness and contrast of the screen on LCD panel 108 by adjusting brightness control 302 and contrast control 303, respectively. Additionally, the color finder buttons and gray scale level scroll bars in FIG. 2(c) are functionally identical to the similar components shown in FIG. 2(b), except for the parallel layout of two sets of eight scroll bars and color finder buttons in FIG. 2(c). In this case, for example, color finder button 312 identifies the color black, button 315 identifies the color green, and button 314 identifies the color white. The gray scale level scroll bars (e.g., scroll bar 313 for the color green) in FIG. 2(c) may be adjusted from the lower gray scale levels at the left of the scroll bars to the higher levels (darker shades) at the right. Essentially, combined view menu 300 does not add any functionality to menus 200 and 210, but simply combines the display of FIG. 2(a) with that of FIG. 2(b).

In this case, if the user of combined view menu 300 desires to find the gray scale mapping for the "color" green on LCD panel 108, color find button 315 is pressed and the "color" green is flashed on the screen. The user may then immediately adjust scroll bar 313 for a desired gray scale level while viewing the display of the relevant "color" on the screen.

Figure 3:
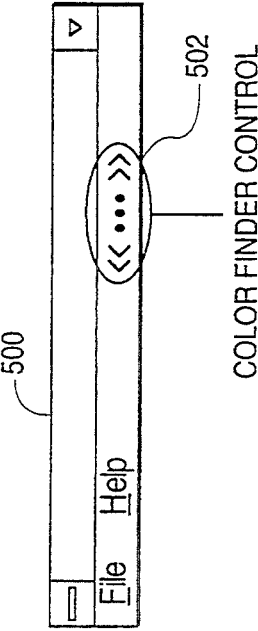
FIG. 3 depicts a portion of the visual window display menu shown in FIGS. 2(b) and 2(c).

FIG. 3 depicts a portion of the visual window display menu shown in FIGS. 2(b) and 2(c). Referring to FIG. 3, in accordance with an embodiment of the present invention, color finder control button 502 is provided in either gray scales only menu 210 or combined view menu 300, which allows the user to control the number of times a selected color (shade of gray) is flashed when its color find button is pressed. Menu bar 500 in FIG. 3 may represent the menu bar from either gray scales only menu 210 or combined view menu 300. To display color finder control button 502 in the menu, the user may double-tap a pen (not explicitly shown) in the middle of the menu bar. Under control of the display control application program, the CPU causes color finder control button 502 to be displayed. The number of dots displayed within the color finder control (between the left and fight arrows) correspond to the number of times the selected color is to be flashed on the monochrome screen. The user may then increase the number of flashes by tapping the fight arrow in the color finder control button or decrease the number by tapping the left arrow. If the user removes all of the dots, then the display control application program reverses the gray scale for the selected color for as long as the pen is held on the color finder control button. In this case, the gray scale for the selected color is reversed (i.e., color highlighted) until the pen is lifted, and the selected color is not flashed. Essentially, conventional computer architecture design and programming techniques may be used to implement the novel color finder control button feature described above, in accordance with the present invention.

Figure 4A:
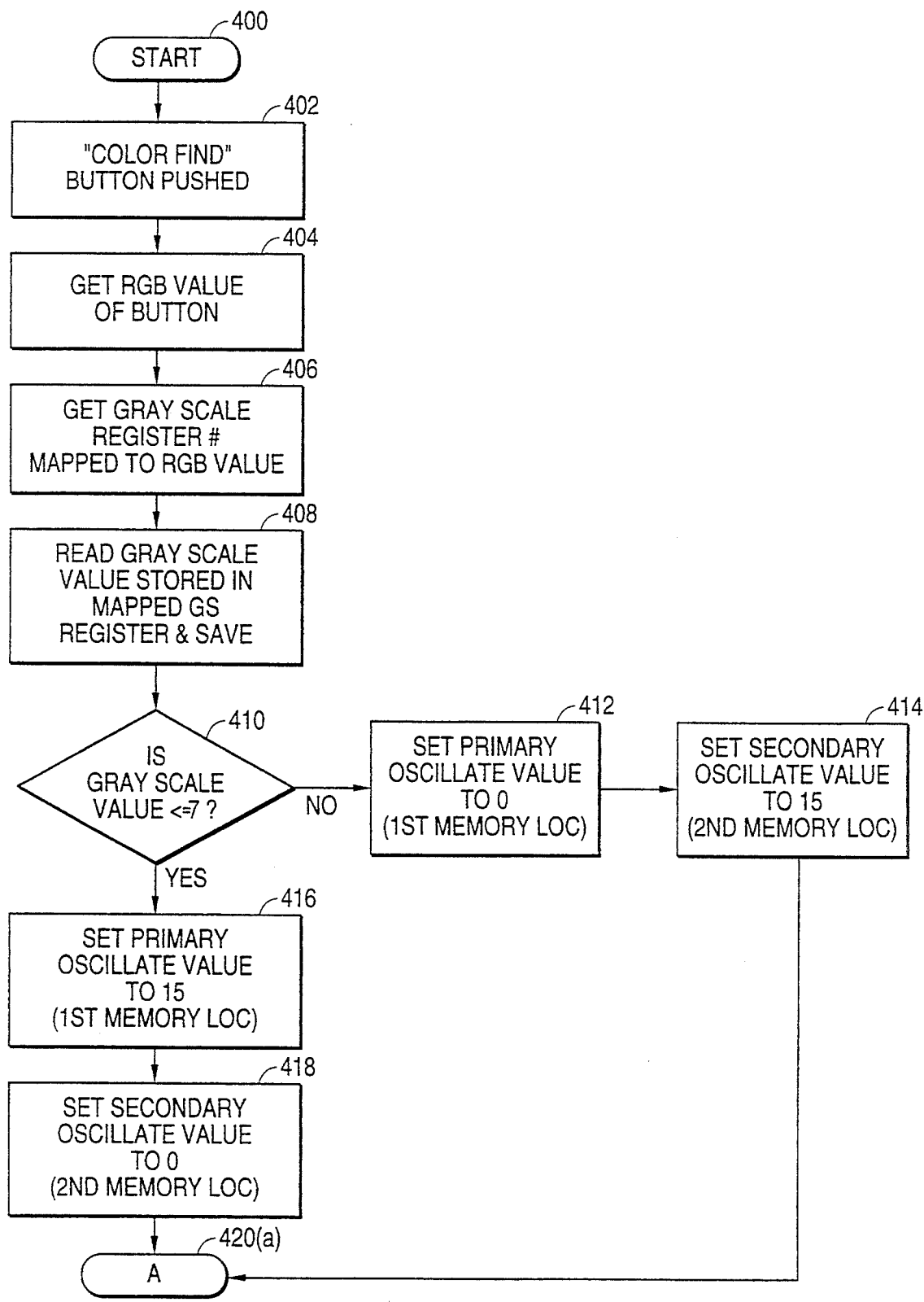
FIGS. 4(a)-(c) illustrate an overall sequence of steps which may be performed to implement a preferred embodiment of the present invention.
Figure 4B:
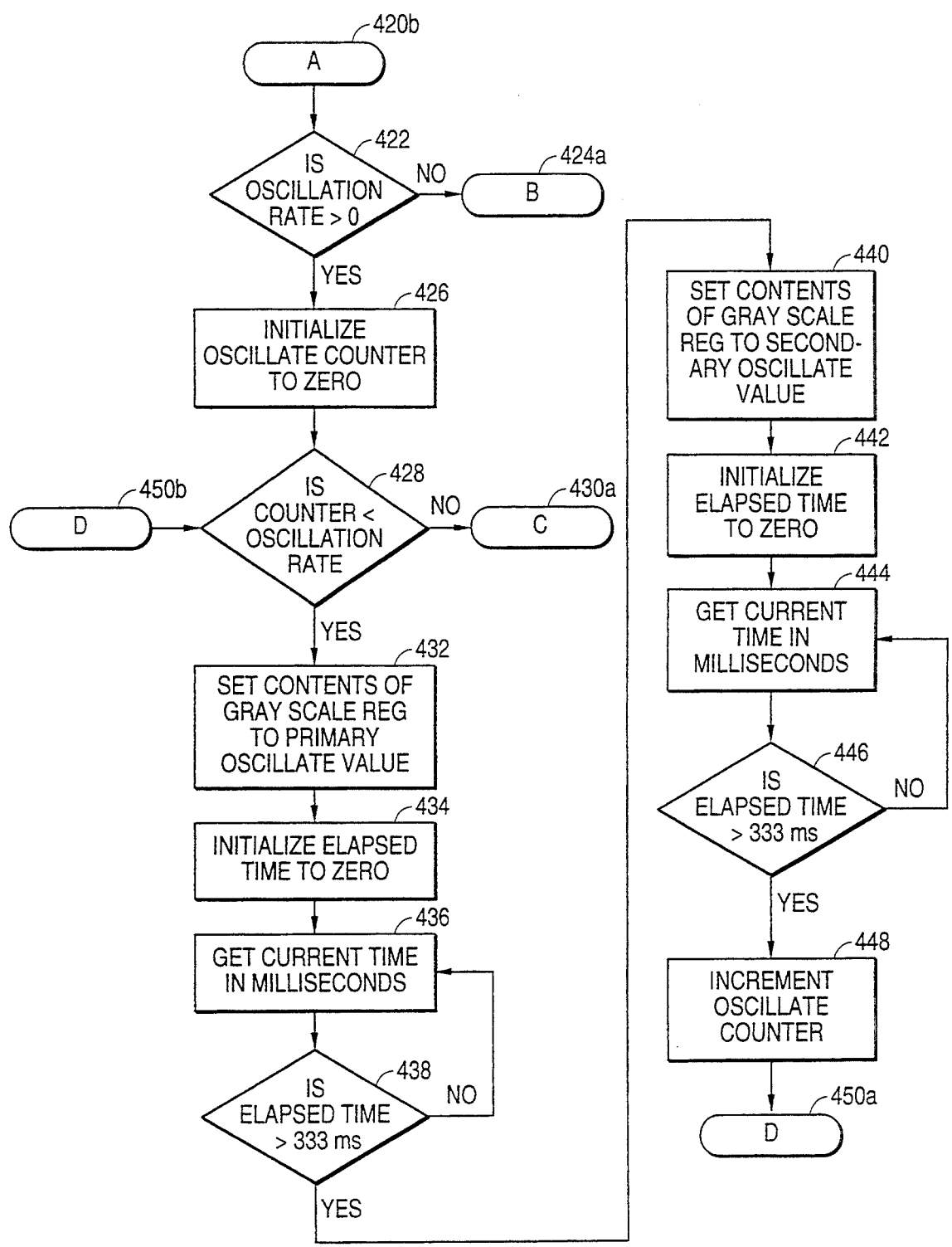
Figure 4C:
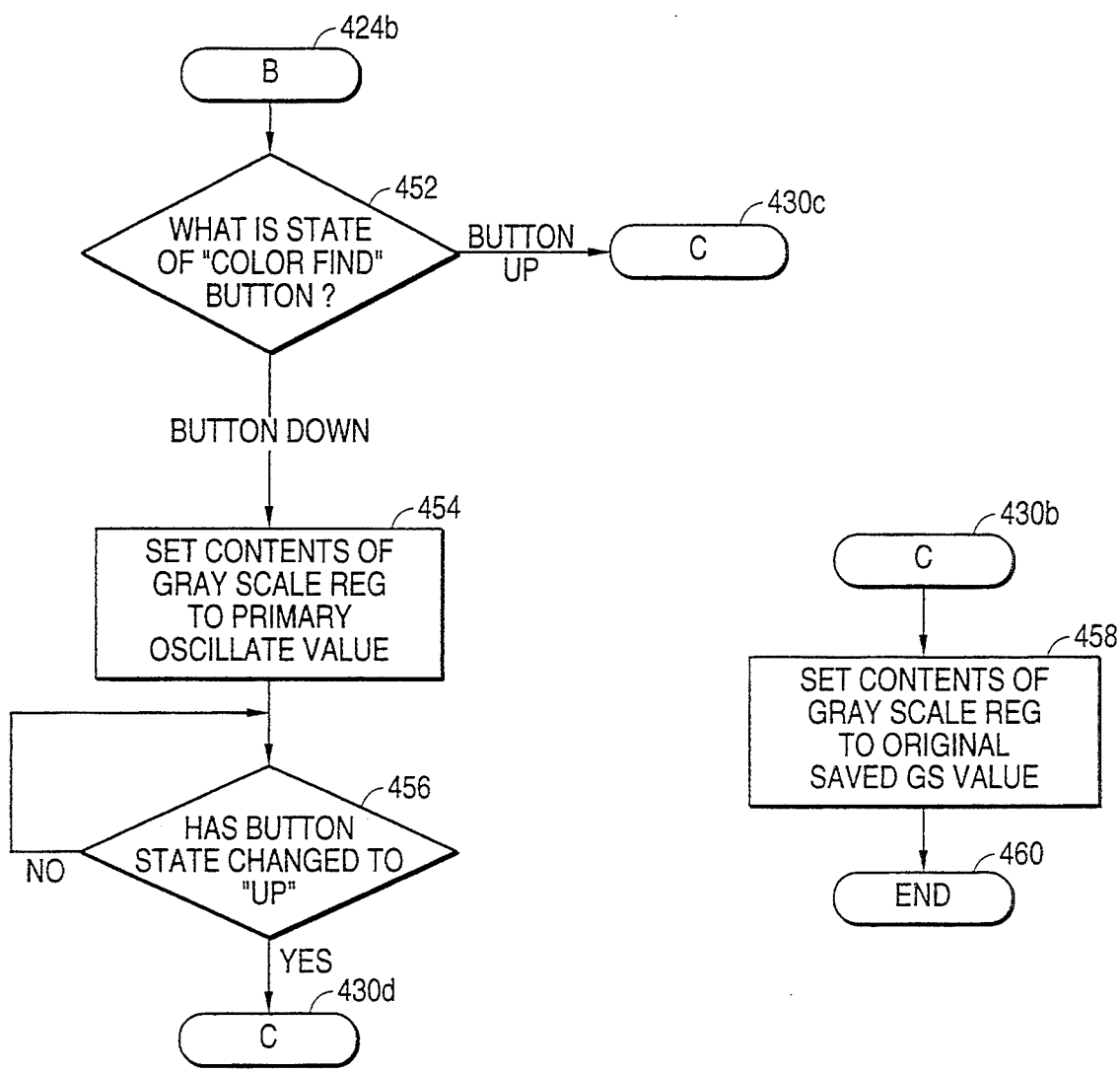

FIGS. 4(a)–(c) illustrate an overall sequence of steps which may be performed to implement a preferred embodiment of the present invention. Referring to step 400 of FIG. 4(a), it is assumed that the user of the Dynapad T100X PC depicted in FIG. 1(a) has selected gray scales only menu 210 (or combined view menu 300) from brightness only menu 200 and desires to ascertain the whereabouts of, for example, the color "green" on the screen of built-in LCD panel 108. At step 402, the user "presses" color find button 215 (or 315) to activate the color find application program. Under the control of the application software at step 404, CPU 101 retrieves from main memory 105 the default RGB value of the button that was pressed, or in this case, the default RGB value for the color green. At step 406, CPU 101 then retrieves from main memory 105 the particular gray scale register number in registers 106 that is mapped to the RGB value of the selected color (green). Next, at step 408, CPU 101 causes the gray scale value stored in the gray scale register whose number was retrieved, to be read and then stored in main memory 105.

Again, as mentioned above with respect to the preferred embodiment, any gray scale selected by the color find button that is between 0 and 7 (inclusive) will be oscillated (flashed) between that value and gray scale 15. Any gray scale that is between 8 and 15 (inclusive) will be oscillated between that value and gray scale 0. In this example, the gray scale value for green is nine.

Specifically, at step 410, CPU 101 determines if the gray scale value stored in main memory 105 (step 408) is less than, greater than, or equal to seven. If that gray scale value is greater than seven, the CPU stores a primary oscillate value of 0 and a secondary oscillate value of 15 in main memory, at steps 412 and 414 in locations 105a and 105b respectively. However, if that value is less than or equal to seven, the CPU then stores a primary oscillate value of 15 and a secondary oscillate value of 0 in main memory locations 105a and 105b, as shown in steps 416 and 418 respectively.

Hereinafter, in the interest of keeping the remaining description as concise as possible, it will be assumed that the operations of the Dynapad T100X PC's hardware depicted in FIG. 1(a) in performing the steps in FIG. 4, will be readily understood by one of ordinary skill in the art of computer architecture design and programming, and consequently, those hardware operations no longer need to be described in detail. For example, it should be readily understood that conventional processing is typically controlled by the Dynapad T100X CPU, and "gets" and "saves" are typical memory retrieval and storage functions, etc., utilizing conventional computer hardware and circuitry.

Referring next to step 422 in FIG. 4(b), the CPU ascertains from a memory storage location whether the user has selected a "flash" rate of zero or a "flash" rate greater than zero. If the flash rate is zero (i.e., oscillation rate equal to 0), step 452 in FIG. 4(c) is then performed. On the other hand, if the flash rate is greater than zero, the operation proceeds to step 426.

Referring first to FIG. 4(c) at step 452, the CPU next determines whether or not the color find button for the selected color is activated. If the color find button is not activated (i.e., "up" state), then at step 458 the original, default RGB value is stored in the pertinent gray scale register located in registers 106. The color find operation is then terminated at step 460.

On the other hand, if the flash rate is greater than zero, at step 426 the "oscillate" counter (typically a register) is initialized and set to a count of 0. Then, at step 428, the CPU determines whether or not the count in the oscillate counter is less than the oscillation rate. If the count is not less than the oscillate rate, then at step 458 (FIG. 4(c)) the original, default RGB value is again stored in the pertinent gray scale register located in registers 106. The color find operation is then terminated at step 460.

However, returning to step 428 in FIG. 4(b), if the count in the oscillate counter is less than the oscillate rate, then the primary oscillate value is retrieved from memory (referring back to step 412 or 416) and stored in the pertinent gray scale register at step 432. Subsequently, at step 434 an elapsed time clock is initialized and set to 0. At this point, the actual flashing operation for the selected color is initiated.

Specifically, after a preselected time has elapsed (333 ms in this embodiment) following steps 436 and 438, the secondary oscillate value is retrieved from memory (referring back to step 414 or 418) and stored in the pertinent gray scale register located in register 106. Consequently, the value in the pertinent gray scale register switches between the current primary and secondary oscillate values. After a second preselected time has elapsed (333 ms) following steps 442 to 446, the oscillate counter is incremented by 1 at step 448 and returned to the decision block at step 428 to continue in the loop until the count is equal to (or greater than) the oscillation rate. In that event, as described above, the operation proceeds to step 458 in FIG. 4(c).

Returning to step 452 in FIG. 4(c), if the color find button is activated (i.e., "down" state), the primary oscillate value is retrieved from memory (referring back to step 412 or 416) and stored in the pertinent gray scale register at step 454. Then, at step 456, the CPU determines whether or not the color find button has been deactivated (i.e., placed in "up" state). Once the color find button is deactivated, the original default RGB value for the selected color (green) is retrieved from memory and stored in the pertinent gray scale register at step 458. The color find operation is then terminated at step 460.

By following the above-described operation in accordance with the present invention, if the oscillation rate is zero, the gray scale value will switch to its most opposite value and hold it there for as long as the color find button for the selected color is pressed down. If the oscillation rate is greater than zero, the gray scale value will oscillate between the primary and secondary values for the number of times equal to the value of the oscillation rate (1 to 5). In this case, the user does not need to hold the button down for the duration of the oscillation sequence; instead, the user "taps" the button once and releases it. This oscillation is observed on the screen immediately by the user, who may then "thumb" the pertinent scroll bar (213 in this example) to adjust the gray scale level as desired.

Referring back to the color find control button 502 shown in FIG. 3, in accordance with an embodiment of the present invention, the oscillation rate described with respect to step 422 in FIG. 4(b) may be set by the display control application program to a value that corresponds to the number of dots selected by the user of button 502. Consequently, the color selected would then be flashed that particular number of times, as a result of operating in accordance with the steps of FIG. 4. If, on the other hand, the user were to remove all of the dots shown on color finder control button 502, then the display control application program could, for example, set the contents of the gray scale register to the reversed gray scale level for the selected color, until the pen is lifted from the control button 502. However, this specific example is provided for illustrative purposes only and the present invention is not intended to be so limited.

This invention has been described in detail in connection with the preferred embodiments but is for illustrative purposes only and the invention is not limited thereto. It will be easily understood by those skilled in the art that variations and modifications can easily be made within the scope of this invention as defined by the appended claims.

We claim:

1. In a computer system having a monochrome display, a method of identifying color usage visually on said monochrome display, said method comprising the steps of:
   (a) selecting a color signal from a plurality of color signals by designating one of a plurality of color finder buttons provided on said monochrome display, each color finder button representing a mapping between one of said color signals and a gray scale level used for displaying pixels on said monochrome display;
   (b) translating said selected color signal into a gray scale signal based on the gray scale level mapped to said selected color signal;
   (c) inverting said gray scale signal;
   (d) cycling a predetermined number of times back and forth between said gray scale signal and said inverted gray scale signal; and
   (e) displaying the results of said cycling visually on said monochrome display.

2. The method according to claim 1, wherein the monochrome display is a liquid crystal display.

3. The method according to claim 1, wherein the monochrome display is a gas plasma display.

4. The method according to claim 1, wherein the computer system operates under a Windows operating system.

5. The method according to claim 1, further comprising a step of adjusting said translation of said color signal to produce a different translation of said selected color signal.

6. The method according to claim 1, further comprising a step of adjusting said predetermined number in said cycling step using a control provided on said monochrome display.

7. The method according to claim 1, wherein step (d) comprises the step of using a number greater than one as said predetermined number.

8. The method according to claim 1, wherein step (d) comprises the step of cycling at a rate sufficient to produce a flashing appearance on said monochrome display.

9. In a computer system having a monochrome display, a method of identifying color usage visually on said display, said method comprising the steps of:
   (a) creating a plurality of translation palette registers, each translation palette register for mapping an available color signal onto a gray scale level signal capable of being visually represented on the monochrome display;

(b) selecting one of said translation palette registers as an active translation palette register;

(c) mapping said available color signal in said active translation palette register into said gray scale level signal and displaying a resultant gray scale level signal;

(d) mapping said available color signal in said active translation palette register into an inverse of said gray scale level signal and displaying a resultant inverted gray scale level signal; and (f) alternating a predetermined number of times back and forth between steps (c) and (d).

10. The method according to claim 9, wherein the predetermined number of times has the value zero.

11. The method according to claim 9, wherein step (f) comprises the step of using a number greater than one as said predetermined number.

12. In a computer system having a monochrome display, a method of identifying color usage visually on said monochrome display, said method comprising the steps of:

(a) selecting a color signal from a plurality of color signals by designating one of a plurality of color finder buttons provided on said monochrome display, each color finder button representing a mapping between one of said color signals and a gray scale level used for displaying pixels on said monochrome display;

(b) identifying a gray scale register mapped to the RGB value of the selected color signal;

(c) determining when the gray scale value stored in said identified gray scale register is greater than a predetermined value;

(d) storing a first oscillate value which is a gray scale value and a second oscillate value which is an inverted gray scale value each in a respective first and second memory storage location when the value stored in step (c) is greater than the predetermined value;

(e) storing the second oscillate value and the first oscillate value each in said respective first and second memory storage location when the value stored in step (c) is not greater than the predetermined value;

(f) storing the value in said first memory location into said identified gray scale register for a first predetermined period of time;

(g) storing the value in said second memory location into said identified gray scale register for a second predetermined period of time; and (h) repeating steps (f) and (g) at a rate sufficient to produce a flashing appearance on said monochrome display.

13. The method according to claim 12, wherein step (f) comprises the step of using a period of less than one second as said first predetermined period of time.

14. In a computer system having a monochrome display, an apparatus for use in identifying color usage visually on said monochrome display, said apparatus comprising:

means for selecting a color signal from a plurality of color signals by providing a plurality of color finder buttons provided on said monochrome display, each color finder button representing a mapping between one of said color signals and a gray scale level used for displaying pixels on said monochrome display;

means for translating said selected color signal into a gray scale signal based on the gray scale level mapped to said selected color signal;

means for inverting said gray scale signal;

means for cycling a predetermined number of times back and forth between said gray scale signal and said inverted gray scale signal; and means for displaying the results of said cycling visually on said monochrome display.

15. The apparatus according to claim 14, wherein the monochrome display is a liquid crystal display.

16. The apparatus according to claim 14, wherein the monochrome display is a gas plasma display.

17. The apparatus according to claim 14, wherein the computer system operates under a Microsoft Windows operating system.

18. The apparatus according to claim 14, further comprising means for adjusting said translation means to thereby produce a different translation of said color signal.

19. The apparatus according to claim 14, further comprising means for adjusting said predetermined number from said monochrome display.

20. The apparatus according to claim 14, wherein said predetermined number is greater than 1.

21. The apparatus according to claim 14, wherein said displayed cycling produces a flashing appearance on said monochrome display.

22. In a computer system having a monochrome display, an apparatus for use in identifying color usage visually on said display, said apparatus comprising:

means for creating a plurality of translation palette registers, each translation palette for mapping an available color signal onto a gray scale level signal capable of being visually represented as a color on the monochrome display;

means for selecting one of said translation palette registers as an active translation palette register;

mapping means for mapping said available color signal in said active translation palette register into said gray scale level signal;

inverse mapping means for mapping said available color signal in said active translation palette register into an inverse of said gray scale level signal; and means for alternately displaying a predetermined number of times the gray scale level signal input from said mapping means and said inverse mapping means.

23. The apparatus according to claim 22, wherein the predetermined number of times has the value zero.

24. The apparatus according to claim 22, wherein said predetermined number is greater than 1.

25. In a computer system having a monochrome display, an apparatus for use in identifying color usage visually on said monochrome display, said apparatus comprising:

means for selecting a color signal from a plurality of color signals by providing a plurality of color finder buttons on said monochrome display, each color finder button representing a mapping between one of said color signals and a gray scale level used for displaying pixels on said monochrome display;

means for identifying a gray scale register mapped to the RGB value of the selected color signal;

means for determining when the gray scale value stored in said identified gray scale register is greater than a predetermined value;

means for storing a first oscillate value which is a gray scale and a second oscillate value which is a inverted gray scale each in a respective first and second memory storage location when the value stored in said identified gray scale register is greater than the predetermined value;

means for storing the second oscillate value and the first oscillate value each in the respective first and second memory storage location when the value stored in said identified gray scale register is not greater than the predetermined value;

means for storing the value in said first memory storage location into said identified gray scale register for a first predetermined period of time; and means for storing the value in said second memory storage location into said identified gray scale register for first a second predetermined period of time, wherein said first and second values are alternately stored into said identified gray scale register to produce a flashing appearance on said monochrome display.

26. The apparatus according to claim 25, wherein said first predetermined period of time is less than one second.

27. Display apparatus comprising:

means for providing on a monochrome display a plurality of color descriptions and a plurality of gray scale values, each color description being mapped to a corresponding gray scale value, wherein said monochrome display comprises a plurality of pixels each having one of said corresponding gray scale values;

means for displaying a plurality of color finder buttons on said monochrome display, each color finder button corresponding to one of said mappings between said color descriptions and said gray scale values;

means, responsive to a user's designation of one of said plurality of color finder buttons, for inverting the gray scale level of all pixels displayed on said monochrome display having the gray scale value corresponding to said designated color finder button; and means for allowing said user to change the mapping between the color description and the gray scale level corresponding to said designated color finder button to a different gray scale value.

28. The apparatus according to claim 27, wherein said inverting means causes said pixels having the gray scale value associated with said designated color finder button to be inverted between the gray scale value and a second opposite value, wherein said inversion is repeated alternately a predetermined number of times between said gray scale value and said second opposite value to produce a flashing appearance on said monochrome display.

* * * * *